United States Patent
Yang et al.

(10) Patent No.: US 10,347,294 B2
(45) Date of Patent: Jul. 9, 2019

(54) GENERATING MOVING THUMBNAILS FOR VIDEOS

(71) Applicant: Google Inc., Mountain View, CA (US)

(72) Inventors: Weilong Yang, Fremont, CA (US); Min-Hsuan Tsai, Cupertino, CA (US); Zheng Sun, Sunnyvale, CA (US); Pei Cao, Palo Alto, CA (US); Tomas Izo, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 1 day.

(21) Appl. No.: 15/199,269

(22) Filed: Jun. 30, 2016

(65) Prior Publication Data

US 2018/0005666 A1    Jan. 4, 2018

(51) Int. Cl.
*G11B 27/034* (2006.01)
*G11B 27/031* (2006.01)
(Continued)

(52) U.S. Cl.
CPC .......... *G11B 27/034* (2013.01); *G06F 16/739* (2019.01); *G06T 7/20* (2013.01);
(Continued)

(58) Field of Classification Search
CPC ........ H04N 5/144; H04N 5/77; H04N 9/8042; H04N 5/23267; H04N 5/232216;
(Continued)

(56) References Cited

U.S. PATENT DOCUMENTS

2007/0266322 A1    11/2007   Tretter et al.
2014/0023348 A1*   1/2014    O'Kelly .............. G11B 27/031
                                                                386/278
(Continued)

FOREIGN PATENT DOCUMENTS

EP    1 909 195 A1    4/2008
EP    2413597 A1 *    1/2010    .............. H04N 5/91
(Continued)

OTHER PUBLICATIONS

International Search Report and Written Opinion dated Mar. 20, 2017, on application No. PCT/US2016/067803.
(Continued)

*Primary Examiner* — Thai Q Tran
*Assistant Examiner* — Syed Y Hasan
(74) *Attorney, Agent, or Firm* — Lowenstein Sandler LLP

(57) ABSTRACT

A method of generating a moving thumbnail is disclosed. The method includes sampling video frames of a video item. The method further includes determining frame-level quality scores for the sampled video frames. The method also includes determining multiple group-level quality scores for multiple groups of the sampled video frames using the frame-level quality scores of the sampled video frames. The method further includes selecting one of the groups of the sampled video frames based on the multiple group-level quality scores. The method includes creating a moving thumbnail using a subset of the video frames that have timestamps within a range from the start timestamp to the end timestamp.

20 Claims, 6 Drawing Sheets

(51) Int. Cl.
G11B 27/28 (2006.01)
G11B 27/32 (2006.01)
G11B 27/10 (2006.01)
G06T 7/20 (2017.01)
G06T 7/00 (2017.01)
G06F 16/738 (2019.01)
G06F 17/24 (2006.01)
G06K 9/00 (2006.01)
H04N 5/14 (2006.01)
H04N 5/225 (2006.01)
H04N 21/234 (2011.01)
H04N 21/8549 (2011.01)
H04N 17/00 (2006.01)

(52) U.S. Cl.
CPC .............. *G06T 7/97* (2017.01); *G11B 27/031* (2013.01); *G11B 27/105* (2013.01); *G11B 27/28* (2013.01); *G11B 27/326* (2013.01); *H04N 17/004* (2013.01); *H04N 21/23418* (2013.01); *H04N 21/8549* (2013.01); *G06F 17/241* (2013.01); *G06K 9/00765* (2013.01); *G06T 2207/10016* (2013.01); *H04N 5/225* (2013.01)

(58) Field of Classification Search
CPC ............. H04N 5/23251; H04N 5/2329; H04N 5/23296; G06K 9/00765; G06F 17/241; G06F 17/30056; G11B 27/3081; G11B 31/006; G06T 3/0093; G06T 3/4007

USPC .................. 386/241, 278, 223; 715/230, 732
See application file for complete search history.

(56) References Cited

U.S. PATENT DOCUMENTS

2015/0121189 A1* 4/2015 Titterington ............. G09B 5/00
715/230
2015/0139608 A1* 5/2015 Theobalt ............. G11B 27/105
386/241
2015/0364158 A1* 12/2015 Gupte ................ G11B 27/3081
386/223
2017/0310901 A1* 10/2017 Sheikh ............... H04N 5/23296

FOREIGN PATENT DOCUMENTS

| EP | 2 413 597 A1 | 2/2012 | | |
| WO | 01/13641 A1 | 2/2001 | | |
| WO | WO 01/13641 A1 * | 2/2001 | .............. | H04N 7/24 |
| WO | 2015/191650 A1 | 12/2015 | | |
| WO | WO 2015/191650 A1 * | 12/2015 | .............. | G06K 9/00 |

OTHER PUBLICATIONS

Yang, W. et al., "Improving YouTube video thumbnails with deep neural nets," Google Research Blog, Oct. 8, 2015, 5 pages, downloaded from http://googleresearch.blogspot.com/2015/10/improving-youtube-video-thumbnails-with.html on Jun. 30, 2016.

* cited by examiner

GENERATING MOVING THUMBNAILS FOR VIDEOS

TECHNICAL FIELD

This disclosure relates to the field of content sharing platforms and, in particular, generating animated thumbnails for video items.

BACKGROUND

Social networks connecting via the Internet allow users to connect to and share information with each other. Many social networks include a content sharing aspect that allows users to upload, view, and share content, such as video items, image items, audio items, and so on. Other users of the social network may comment on the shared content, discover new content, locate updates, share content, and otherwise interact with the provided content. The shared content may include content from professional content creators, e.g., movie clips, TV clips, and music video items, as well as content from amateur content creators, e.g., video blogging and short original video items.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for creating a moving thumbnail is disclosed. The method includes sampling video frames of a video item. The method further includes determining frame-level quality scores for the sampled video frames. The method also includes determining multiple group-level quality scores for multiple groups of the sampled video frames using the frame-level quality scores of the sampled video frames. The groups are defined by applying a sliding window to the sampled video frames. The method further includes selecting one of the groups of the sampled video frames based on the multiple group-level quality scores. The selected group of sampled video frames includes a set of consecutively sampled video frames and has a start timestamp associated with a first sampled video frame in the set of consecutively sampled video frames and an end timestamp associated with a last sampled video frame in the set of consecutively sampled video frames. The method includes creating a moving thumbnail using a subset of the video frames that have timestamps within a range from the start timestamp to the end timestamp.

In another implementation, sampling the video frames of the video item includes sampling the video frames of the video item at a fixed sampling rate. In still another implementation, sampling the video frames of the video item includes sampling the video frames from a beginning portion of the video item.

In other implementation, determining frame-level quality scores for the sampled video frames includes generating one or more quality scores for each of the sampled video frames in view of one or more of multiple frame-level scorers and summing the one or more quality scores for each of the sampled video frames to generate the frame-level quality scores for the sampled video frames.

In one implementation, generating one or more quality scores for each of the sampled video frames in view of one or more of the multiple frame-level scorers includes generating a first quality score for each of the sampled video frames using a thumbnail quality scorer that measures a visual quality of the sampled video frames. The method also includes generating a second quality score for each of the sampled video frames using a face scorer that measures a size of a face relative to a size of the sampled video frames. The method further includes generating a third quality score for each of the sampled video frames using a motion scorer that measures motion between two consecutively sampled video frames. In another implementation, summing the quality scores for each the sampled video frames includes summing the quality scores from the multiple frame-level scorers using a linear weighted summation.

In one implementation, determining the multiple group-level quality scores for the multiple groups of the sampled video frames using the frame-level quality scores of the sampled video frames further includes applying the sliding window to different positions along a time axis to group the sampled video frames into multiple groups of the sampled video frames. The sampled video frames are ordered with respect to the time axis in view of corresponding timestamps. The frame-level quality scores of a particular group of sampled video frames are used to determine a group-level quality score for the particular group.

In another implementation, determining the multiple group-level quality scores for the multiple groups of the sampled video frames using the frame-level quality scores of the sampled video frames includes applying the sliding window to a first position with respect to a time axis. The sliding window extends for a fixed duration and a first group of the multiple groups of the sampled video frames is within the sliding window at the first position with respect to the time axis. The method includes determining a first group-level quality score of the multiple group-level quality scores by aggregating frame-level quality scores associated with the first group of sampled video frames. The method also includes applying the sliding window to a second position with respect to the time axis. The second group of the multiple groups of the sampled video frames is within the sliding window at the second position with respect to the time axis. The method included determining a second group-level quality score of the multiple group-level quality scores by aggregating frame-level quality scores associated with the second group of sampled video frames.

In another implementation, the method further includes modifying the subset of the video frames of the moving thumbnail so at least one of a first video frame of the subset of the video frames or a last video frame of the subset of the video frames is proximate a shot boundary of the video item.

In one implementation, the method includes modifying a playback speed of the moving thumbnail in view of motion measured in the subset of the video frames of the moving thumbnail.

In additional implementations, one or more processing devices for performing the operations of the above described implementations are disclosed. Additionally, in implementations of the disclosure, a non-transitory computer readable storage medium stores instructions for performing the operations of the described implementations. Also in other implementations, systems for performing the operations of the described implementations are also disclosed

DESCRIPTION OF DRAWINGS

Various implementations of the present disclosure will be understood more fully from the detailed description given below and from the accompanying drawings of various implementations of the disclosure.

DETAILED DESCRIPTION

Figure 1:
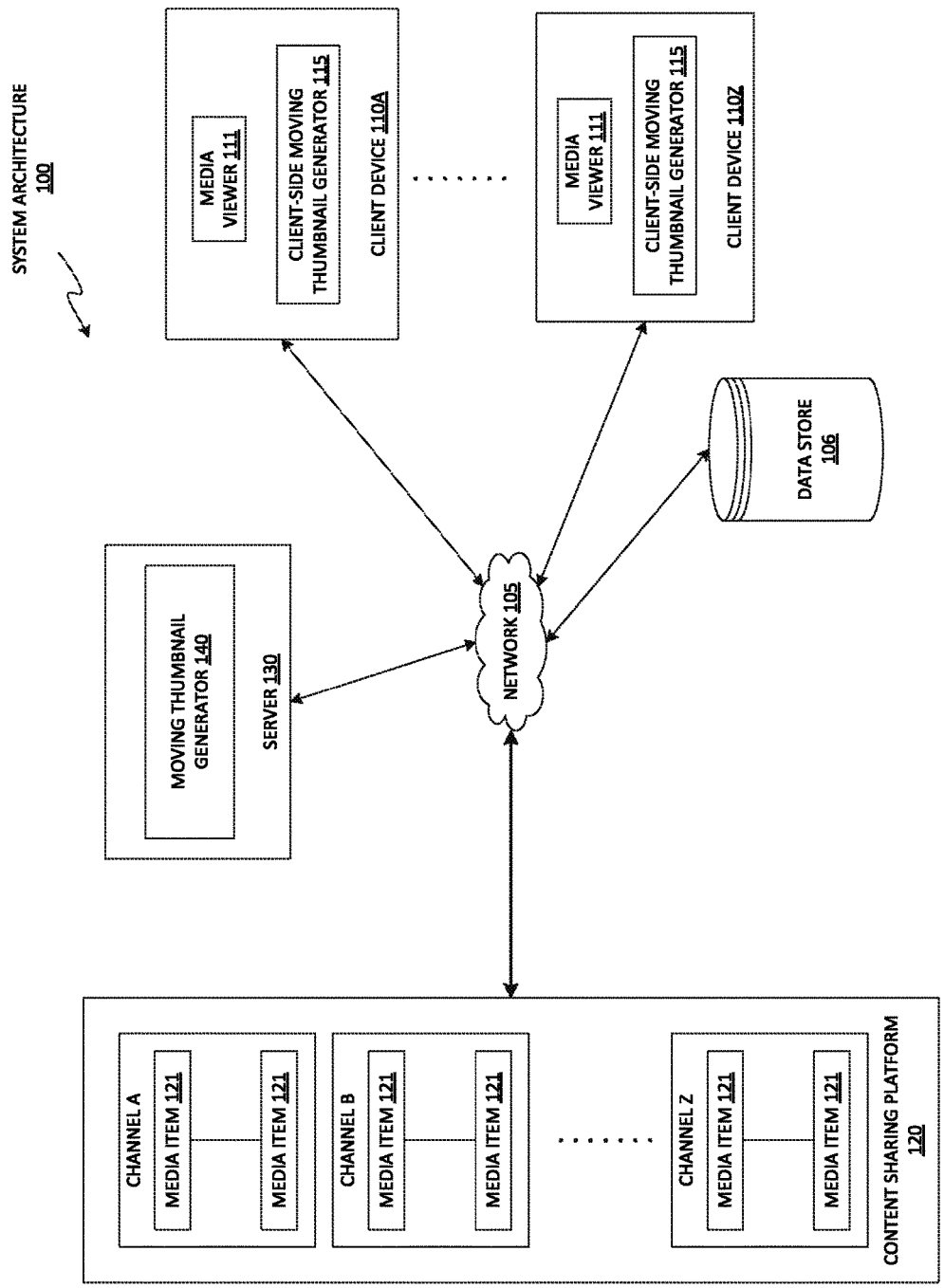
FIG. 1 illustrates an example system architecture 100, in accordance with one implementation of the disclosure

Video items (also referred to as "videos" or "video content") may be consumed by a user via a client device. One or more video items may be presented to a user using a user interface (UI) displayed on a display screen of a client device. A user may select via the user interface one or more video items for playback. Often the video items are presented to a user as thumbnails, and a user selects a thumbnail to start playback of the associated video item. For example, a static thumbnail image representing a video item may be presented to a user in a UI to differentiate one video item from another video item and to provide the user with some information about the associated video item. A static thumbnail image may be a single low-resolution image frame selected from the associated video item that conveys limited information about the video item. A user may select the static thumbnail image to begin playback of the associated video item. The information provided by the static thumbnail may be limited and may not provide a user with enough information to make an informed selection.

A moving thumbnail may be displayed on a client device to provide the user additional information about a video item. A moving thumbnail (also referred to as a "video clip") may be a representative portion of a video item that includes sequential video frames from the portion of the video item representing a scene in motion. For example, a video item may be 2 minutes in length. A moving thumbnail may be an 8 second video clip that incorporates all or some of the video frames from, for example, the 30th second to 38th second of the 2 minute video item. Selecting a representative portion of the video item to use as a moving thumbnail presents challenges. For example, the moving thumbnail may present too much information and spoil the video item for the user. For instance, the moving thumbnail may include the ending of the video. In another example, a moving thumbnail may be a portion of the video item that contains too little information. For instance, the 8 second moving thumbnail may be a scene shot predominantly in the dark.

Aspects of the present disclosure address the above-mentioned and other deficiencies by providing a moving thumbnail that conveys important information about a video and attracts viewers to the video. In particular, multiple video frames of a video item can be sampled, and a frame-level quality score can be determined for each of the sampled video frames. A sliding window can be applied to the sampled video frames to produce multiple group-level quality scores for multiple groups of the sampled video frames. One of the groups of sampled video frames may be selected based on the group-level quality scores. The selected group of sampled video frames can include a set of consecutively sampled video frames. The group of sampled video frames may have a start timestamp associated with the first sampled video frame of the set of consecutively sampled video frames and an end timestamp associated with the last sampled video frame of the set of consecutively sampled video frames. A timestamp may be data, such as metadata, associated with a video frame of a video item that identifies a time of a corresponding video frame with respect to a time axis used to define the order of video frames during playback of the video item. A subset of the video frames that have timestamps within a range from the start timestamp to the end timestamp are retrieved from a data store and used to create a moving thumbnail that is a representative portion of the video item.

In one implementation, the multiple video frames of a video item are sampled at a fixed sampling rate, for example 2 frames per second (fps). In one example, a portion (having the size/duration of 100 seconds) of a full-frame rate video item (e.g., displayed 24 fps or greater) may be sampled to identify 200 sampled video frames. A frame-level quality score is generated for each of the sampled frames. A frame-level quality score may be a value attributed to a video frame (e.g., sampled video frame) that is indicative of one or more qualities of the video frame (e.g., visual quality, facial quality, motion quality) for use in a moving thumbnail. One or more frame-level scorers (e.g., also referred to as frame-level quality scorer) may be used to generate quality scores for the sampled video frames. For example, a sampled video frame is used as input data for a frame-level scorer. The frame-level scorer generates a quality score for the sampled video frame. For instance, a sampled video frame showing a small dark facial image may have a facial quality score of "0.1" while another sampled video frame showing a clear image of a face may have a facial quality score of "0.8." Multiple group-level quality scores may be determined using the frame-level quality scores for the sampled video frames. A group-level quality score may be a value attributed to a group of video frames that is indicative of one or more qualities of the group of video frames (e.g., visual quality, facial quality, motion quality). A sliding window of a fixed duration/size (e.g., 8 seconds) is applied to the sampled video frames to define multiple groups. For example, the sampled video frames may be consecutively ordered with respect to a time axis using the timestamp associated with each sampled video frame. The size of the sliding window may be selected to be approximately equal to the duration/length of the desired moving thumbnail, for example 8 seconds. The sliding window is applied to different positions along the time axis to group the sampled video frames aligned along the time axis. In one example, a sliding window with a duration/size of 8 seconds contains a different set of consecutively sampled video frames (e.g., 16 video frames if the sampling rate is 2 fps) at each position along the time axis. As the multiple groups of the sampled video frames are determined, a group-level quality score for each group may also be determined. For example, a group includes a set of consecutively sampled video frames. Each video frame of the set of consecutively sampled video frames is associated with a frame-level quality score. The frame-level quality scores for a particular set of consecutively sampled video frames of a group are aggregated to determine a group-level quality score for the group. A group-level quality score may be determined for each of the multiple groups. One group of the multiple groups of the sampled video frames may be selected based on, for example, the group having the highest group-level quality score. The set of consecutively sampled video frames of the selected group includes a first sampled video frame associated with a start timestamp and a last sampled video frame associated with an end timestamp. A subset of the video frames having timestamps within a range from the start timestamp to the end timestamp may be retrieved from a database and used to create a moving thumbnail of the video item.

In another implementation, the moving thumbnail may be further modified to ensure that at least one of the first video frame of the subset of video frames and the last video frame of the subset of video frames is proximate a shot boundary. A shot may be a series of consecutive video frames taken by a single video camera and representing a continuous (uninterrupted) action in time and space. A shot boundary (also referred to as "shot transition") may a boundary between two consecutive video frames of a video item where the two different shots are edited together. For example, a video item may have a first shot of a bird flying edited together with a second shot taken underwater of a whale swimming. The shot boundary may exist between the last video frame of the shot of the bird flying and the first frame of the shot of the whale swimming.

In another implementation, the moving thumbnail may be further modified to change the playback speed of the moving thumbnail based on motion measured in the subset of video frames of the moving thumbnail. For example, the motion between adjacent video frames of the moving thumbnail may be measured. If the motion of adjacent video frames of a moving thumbnail is under a threshold, e.g., determined to be slow, the playback speed of the moving thumbnail may be increased, such as 1.5 times the playback speed. If the motion of adjacent video frames of a moving thumbnail is above a threshold, e.g., determined to be fast, the playback speed of the moving thumbnail may be maintained at the original playback speed.

Accordingly, aspects of the present disclosure allow for the generation of high-quality moving thumbnails that contain information that is relevant and useful to the user. As compared to randomly selecting a part of a video item or always selecting the same part of every video item, the moving thumbnails provided by the aspects of the present disclosure significantly simplify and improve the selection of a portion of a video item for the generation of moving thumbnails.

FIG. 1 illustrates an example system architecture 100, in accordance with one implementation of the disclosure. The system architecture 100 includes client devices 110A through 110Z, a network 105, a data store 106, a content sharing platform 120, and a server 130.

In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). In one implementation, data store 106 stores at least one of video items or moving thumbnails.

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, video items, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital video items, digital images, electronic books, etc.). According to aspects of the disclosure, the media viewer 111 may be a content sharing platform application for users to record, edit, and/or upload content for sharing on the content sharing platform, and implements and/or generates moving thumbnails that are associated with video items.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed including at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as content or a content item.

A media item 121 may be consumed via the Internet and/or via a mobile device application. For brevity and simplicity, a video item is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. In another implementation, the content sharing platform 120 may store video items and/or moving thumbnails as electronic files in one or more formats using data store 106.

In one implementation, the server 130 may be one or more computing devices (e.g., a rackmount server, a server computer, etc.). In one implementation, the server 130 may be included in the content sharing platform 120. The server 130 may include a moving thumbnail generator 140. The moving thumbnail generator 140 enables the generation of moving thumbnails for associated video items described in the disclosure. In some implementations, client device 110A-110Z may include a client-side moving thumbnail generator 115 that enables the generation of moving thumbnails. Client-side moving thumbnail generator 115 may perform implementations of the disclosure independently of moving thumbnail generator 140 of server 130, or may work in conjunction with moving thumbnail generator 140. Although the following description may refer to moving thumbnail generator 140 performing implementations of the disclosure, it may be understood that functionality of moving thumbnail generator 140 may be similarly performed solely by, and/or in conjunction with, client-side moving thumbnail generator 115 at client device 110A-110Z.

In one implementation, user content may include a video item and/or moving thumbnail. A video item is a set of sequential video frames (e.g., image frames) representing a scene in motion. For example, a series of sequential video frames may be captured continuously or later reconstructed to produce animation. Video items and/or moving thumbnails may be presented in various formats including, but not limited to, analog, digital, two-dimensional and three-dimensional video. Further, video items may include movies, video clips or any set of animated images to be displayed in sequence. Moving thumbnails may include a one or more portions of a movie, be video-clips, or any set of animated images to be displayed in sequence. In addition, video items and/or moving thumbnails may be stored in a video file that includes a video component and an audio component. The video component may refer to video data in a video coding format or image coding format (e.g., H.264 (MPEG-4 AVC), H.264 MPEG-4 Part 2, Graphic Interchange Format (GIF), WebP, etc.). The audio component may refer to audio data in an audio coding format (e.g., advanced audio coding (AAC), MP3, etc.). It may be noted GIF may be saved as an image file (e.g., .gif file) or saved as a series of images into an animated GIF (e.g., GIF89a format). It may be noted that H.264 may be a video coding format that is block-oriented motion-compensation-based video compression standard for recording, compression, or distribution of video content, for example. In one implementation, a video item and/or moving thumbnail is a full-frame rate video displayed at or greater than 24 frames per second.

In one implementation, moving thumbnail generator 140 creates or generates moving thumbnails for video items stored in data store 106. Moving thumbnail generator 140 may retrieve one or more video items stored in data store 106. Moving thumbnail generator 140 samples the video frames of the video item at a fixed sampling rate (e.g., 2 fps). For each of the sampled video frames, moving thumbnail generator 140 determines a frame-level quality score. Moving thumbnail generator 140 may determine multiple group-level quality scores for multiple groups of the sampled video frames using the frame-level quality scores of the sampled video frames. The multiple groups are defined by applying a sliding window to the sampled video frames. Moving thumbnail generator 140 selects a group from the multiple groups of the sampled video frames based on the group-level quality scores. The selected group of sampled video frames includes a set of consecutively sampled video frames and has a start timestamp associated with a first sampled video frame in the set of consecutively sampled video frames and an end timestamp associated with a last sampled video frame in the set of consecutively sampled video frames. Moving thumbnail generator 140 may retrieve a subset of the video frames of the video item from the data store 106. The subset of the video frames may be video frames that are within a range from the start timestamp to the end timestamp. Moving thumbnail generator 140 may use the subset of video frames to create the moving thumbnail for the particular video item.

In one implementation, moving thumbnail generator 140 may store the moving thumbnails in data store 106. Moving thumbnail generator 140 may associate a moving thumbnail with a particular video item using for example, an identifier. For example, moving generator 140 may associated a moving thumbnail with a video item using an identifier stored as metadata of the video item and/or stored as metadata of the moving thumbnail. It should be noted that although one moving thumbnail is described as generated for a particular video item, in other implementations more than one moving thumbnail may be generated for a video item.

In one implementation, the moving thumbnails may be displayed on the client device 110A-110Z using for example, media viewer 111. Playback of the moving thumbnails may be initiated by various techniques. For example, a moving thumbnail may begin playback on the client device 110A-110Z after a user performs a thumbnail playback operation with respect to a moving thumbnail using a finger, cursor, or other object. In another example, a moving thumbnail may begin playback automatically (without user interaction) when a moving thumbnail is located in a visible portion of a display screen of client device 110A-110Z. Moving thumbnails may be displayed using corresponding video data, audio data, or a combination thereof. In one implementation, a user may perform a thumbnail selection operation with respect to a moving thumbnail to view the associated video item. For example, a user may perform the thumbnail selection operation using a finger, cursor, or other object. The thumbnail selection operation may be different from the thumbnail playback operation. For example, the thumbnail playback operation may be a swipe gesture and the thumbnail selection operation may be a single or double click.

Selecting the moving thumbnail may cause media viewer 111 to request the associated video item from server 130 and/or content sharing platform 120. In response to the request, server 130 and/or content sharing platform 120 may identify and retrieve the associated video item from data store 106 and send the video item to media viewer 111 for display.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
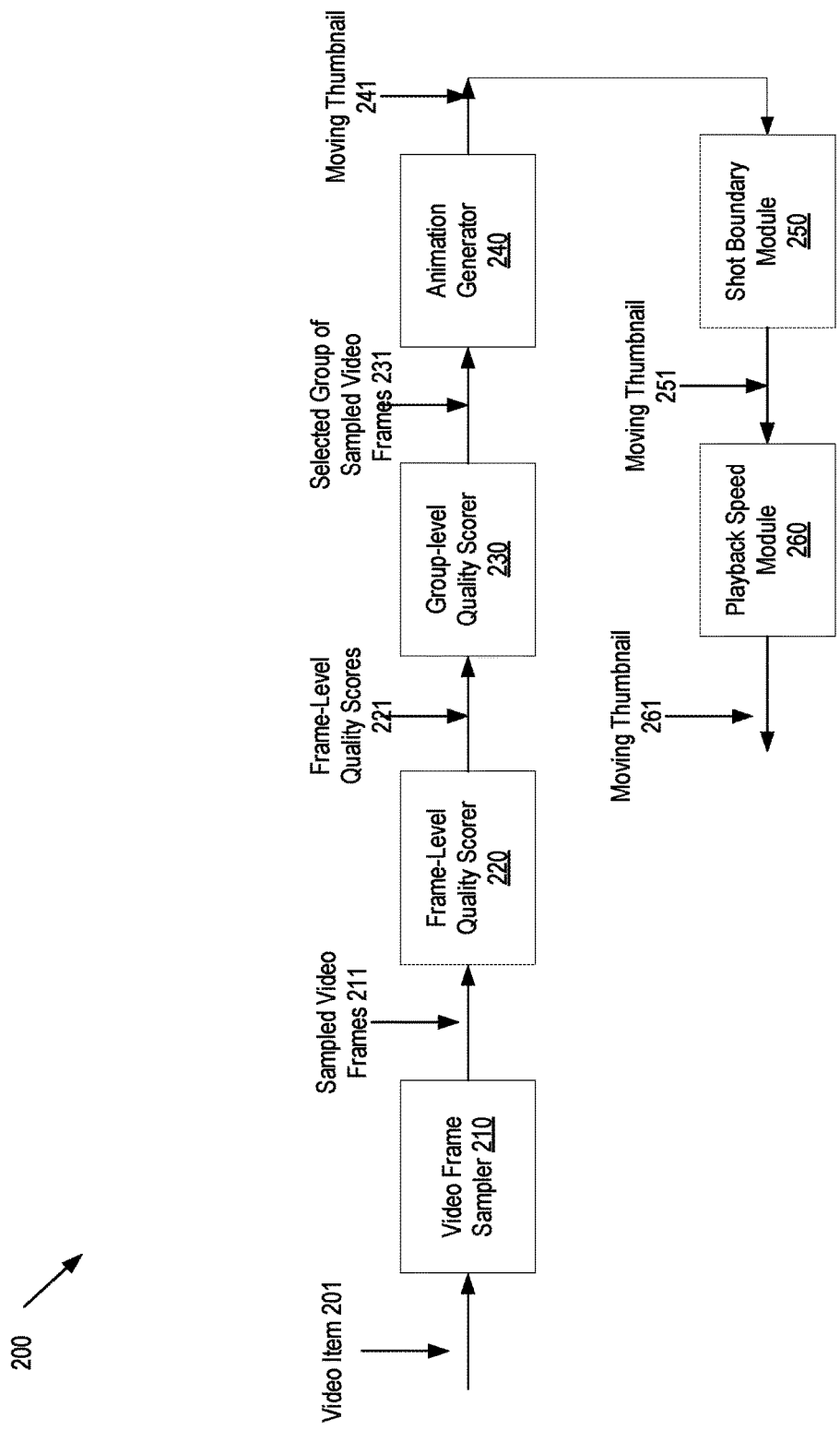
FIG. 2 is an example pipeline for a moving thumbnail generator, in accordance with an implementation of the disclosure.

FIG. 2 is an example pipeline for a moving thumbnail generator, in accordance with an implementation of the disclosure. Moving thumbnail generator 200 may be similar to moving thumbnail generator 140 as discussed with respect to FIG. 1. In one implementation, moving thumbnail generator 200 is part of server 130 of FIG. 1. Moving thumbnail generator 200 includes video frame sampler 210, frame-level quality scorer 220, group-level quality scorer 230, animation generator 240, shot boundary module 250, and playback speed module 260. It should be noted that moving thumbnail generator 200 may include fewer, the same, or additional components.

Video frame sampler 210 may receive a video item 201 from data store 106 of FIG. 1. Video item 201 may include multiple video frames. Video frame sampler 210 may be implemented, at least in part, as a video decoder, such as a software video decoder and/or a hardware video decoder. Video frame sampler 210 may sample all or some of the video frames of video item 201. In one implementation, video frame sampler 210 samples the video frames of video item 201 at a fixed sampling rate, such as 2 fps. It should be noted that video frames may be sampled in other ways, such as intervals, periodically, randomly, etc. In another implementation, a portion of video item 201 may be sampled. For example, video frame sampler 210 may sample a beginning portion of the video item 201, and not sample an ending portion of video item 201. The beginning portion of the video item 201 may be a portion of video item 201 that does not include a spoiler of video item 201. The ending portion of the video item 201 may include the spoiler of the video item 201. The beginning portion may be the first half of video item 201 or the first two-thirds of video item 201, for example. Video frame sampler 210 samples the video frames of at least a portion of video item 201 and identifies sampled video frames 211. Each video frame 211 of video item 201 may be associated with a timestamp that identifies a time of a corresponding video frame with respect to a time axis used to define the order of video frames 211 during playback of the video item. Sampled video frames 211 may be stored in data store 106.

In one example, video item 201 is a full frame rate video (e.g., 24 fps) that is 2 minutes in length. Video frame sampler 210 may sample the video frames of the beginning portion of video item 201 (e.g., the first half of video item 201) at 2 fps. Video frame sampler 210 may sample 120 video frames from the first minute of video item 201, for example.

Frame-level quality scorer 220 may receive the sampled video frames 211 from video frame sampler 210 or data store 106 and generate frame-level quality scores for each of the sampled video frame 211. In one implementation, frame-level quality scorer 220 uses one or more frame-level quality scorers (e.g., thumbnail quality scorer, close-up face scorer, and motion scorer) to generate multiple quality scores (e.g., visual quality score, facial quality score, and motion quality score, respectively) for each of the sampled video frames 211. The multiple quality scores may be aggregated to generate a single frame-level quality score for a particular sampled video frame. A frame level quality scorer may implement a quality model that uses a video frame as input data and outputs a quality score indicative of one or more qualities of the input video frame. The quality score may be a value, such as a decimal value between 0 to 1, where 0 indicates low quality and 1 indicated high quality. Each of the frame-level scorers may measure different qualities, e.g., visual quality, facial quality, motion quality. Frame-level quality scorer 220 may generate frame-level quality scores 221 for sampled video frames 211 and associate the frame-level quality scores 221 with the particular one of the sampled frames 211. For example, the frame-level quality scores 221 may be stored as metadata of the corresponding one of the sampled video frames 211. The frame-level quality scores 221 may be stored in data store 106 of FIG. 1.

In one implementation, to generate one or more quality scores for each of the sampled video frames 211, frame-level quality scorer 220 generates a first quality score for the sampled video frame 211 using a thumbnail quality scorer. Frame-level quality scorer 220 may generate a second quality score for the sampled video frame 211 using a face scorer. Frame-level quality scorer 220 may also generate a third quality score for the sampled video frame 211 using a motion scorer.

For example, frame-level quality scorer 220 may include multiple frame-level quality scorers: a thumbnail quality scorer that determines a visual quality score for a video frame, a close-up face scorer that determines a facial quality score for a video frame, and a motion scorer that determines a motion quality score for two adjacent video frames. In one example, the thumbnail quality scorer may generate a visual quality score of 0.8 for a first sampled video frame. A visual quality score may be an indication of how a video frame is perceived by a user (e.g., low quality or high quality). Close-up face scorer may generate a facial quality score of 0.3 for the first sampled frame. Close-up face scorer may measure a ratio of a size of a detected face in a video frame to a size of the video frame. A motion scorer may generate a motion quality score of 0.5 for the first sampled frame. The motion scorer may measure motion (e.g., changes in object positions) between two consecutively sampled video frames. In one example, the frame-level quality score for the first sampled frame may be the sum of the three quality scores (e.g., (0.8)+(0.3)+(0.5)=1.6–frame-level quality score). Each of the sampled frames may undergo a similar process to generate an associated frame-level quality score.

The quality scores from different frame-level quality scorers may be combined in different ways. In some implementations, an average of the quality scores may be used to generate a frame-level quality score for a particular sampled frame. For example, the quality scores for the sampled video frame can be combined using a linear weighted summation. That is, the quality scores from different frame-level quality scorers may be weighted differently. For example, the score of the thumbnail quality scorer may be weighted as (0.4), the score of the close-up face scorer may be weighted (0.3), and the score of the motion scorer may be weighted as (0.3). In the above example, the linear weighted summation may be (0.4) (0.8)+(0.3) (0.6)+(0.3) (0.5)=0.53, where 0.53 represents the frame-level quality score of the first sampled video frame. In some implementations, the weights for scores of different frame-level quality scorers can be specified by a system administrator.

In one implementation, a thumbnail quality scorer may measure a visual quality of a video frame using a thumbnail quality model. The thumbnail quality model may be a binary classification model trained using a set of training data to classify subsequent video frames as having high visual quality or low visual quality. The training data may include video frames and a classification of each video frame as high-quality or low-quality. The training data may be selected by a system administrator. The thumbnail quality model may be trained based on deep neural networks (DNN).

In one implementation, the close-up face scorer measures a ratio of the size of detected face in a video frame to the size of the video frame. A face in a video frame may be a desirable quality for a user viewing the moving thumbnail. A face that is too small compared to size of the video frame or a face that is too large compared to the size of the video frame may be undesirable. In one implementation, close-up face scorer detects a face. Responsive to detecting the face, the close-up face scorer compares the size of the detected face to the size of the video frame to determine a face ratio (e.g., size of face/size of video frame). If the face ratio is less than or equal to a threshold (e.g., 0.375), the face ratio is saved as the facial quality score. If the face ratio is greater than the threshold, the facial quality score may be calculated using a weighted equation, such as 2×(threshold)−face ratio. For example, if the face ratio is 0.6 and the threshold is 0.375, the facial quality score is 2×(0.375)−0.6=0.15. If the facial quality score is calculated to be less than zero, zero may be used as the facial quality score. It should be noted that the facial quality score may be determined in other ways.

In one implementation, the motion scorer measures motion between two adjacent sampled frames. For example, the motion scorer may measure the motion between a first sampled video frame with a timestamp of 1 second and a second sampled video frame with a timestamp of 1.5 seconds. The motion scorer may measure the motion by creating color histograms of the two adjacent sampled video frames and identifying the dissimilarity of color histograms between the two adjacent sampled video frames. The more dissimilar the two adjacent sampled video frames, the higher the motion quality score will be (e.g. indicating a higher motion between the two video frames). In some implementations, the motion quality score is equal to (1−cosine similarity between the histograms of two adjacent video frames).

In some implementations, the quality score from a single frame-level quality scorer may be used as the frame-level quality score. In other implementations, the quality scores from multiple frame-level quality scorers may be aggregated to generate the frame-level quality score. It should be noted that although three frame-level scorers are described, any number and any type of frame-level quality scorer may be implemented. It should also be noted that frame-level scorers may measure different qualities of a video frame, such as or in addition to, visual quality, facial quality, and motion quality.

Group-level quality scorer 230 may receive the sampled video frames 211 and frame-level quality scores 221 from frame-level quality scorer 220 and/or data store 106. In one implementation, group-level quality scorer 230 may determine multiple groups of the sampled video frames and then determine multiple group-level quality scores for the multiple groups of the sampled video frames. The multiple groups can be determined by applying a sliding window to the sampled video frames 211. The sliding window can repetitively start at different positions along the time axis to group the sampled video frames 211 into multiple groups. A sliding window of a size equal to a fixed duration (e.g., 4 seconds) can be used, and by recursively moving the sliding window to different positions along the time axis, different groups of sampled frames can be formed based on various locations of the sliding window. In one implementation, group-level quality scorer 230 may continue to apply the sliding window to different positions until all the sampled video frames 211 are part of at least one group. Aspects of the usage of a sliding window are described in more detail with respect to FIG. 3.

The frame-level quality scores of sampled video frames of a particular group are used to determine the group-level quality score for the particular group. For example, the frame-level quality scores of a particular group may be summed together to determine the group-level quality score for the particular group. Group-level quality scorer 230 may select one group from the multiple groups of sampled video frames based on the multiple group-level quality scores. For example, group-level quality scorer 230 may select the group of sampled video frames with the best (e.g., highest) group-level quality score. The selected group of sampled video frames 231 includes a set of consecutively sampled video frames. A first sampled video frame of the set of sampled video frames is associated with a start timestamp and the last video frame of the set of sampled video frames is associated with an end timestamp. The selected group of sampled video frames 231 may be stored in data store 106 and/or sent to animation generator 240. In one implementation, to determine the group-level quality scores for multiple groups of the sampled video frames 211, the sampled video frames 211 are arranged with respect to a time axis in view of timestamps associated with the sampled video frames 211.

Animation generator 240 may retrieve the selected group of sampled video frames 231 from group-level quality scorer 230 or data store 106. As noted above, the selected group of sampled video frames 231 may be a set of consecutively sampled video frames. A first sampled video frame of the set of consecutively sampled video frames is associated with a start timestamp and the last video frame of the set of consecutively sampled video frames is associated with an end timestamp. Animation generator 240 may retrieve the video frames from data store 106 that are within a range from the start timestamp to the end timestamp (e.g., subset of the video frames of the video item 201). Animation generator 240 may combine the subset of video frames using the associated timestamps to create moving thumbnail 241. Moving thumbnail 241 and video item 201 may be associated with each other using an identifier. For example, an identifier may be stored in the metadata of moving thumbnail 241 and/or video item 201. The moving thumbnail 241 may be stored in data store 106 in one or more file formats.

Shot boundary module 250 may receive moving thumbnail 241 from animation generator 240 and/or data store 106. The beginning and/or ending of moving thumbnail 241 may respectively precede and/or follow a shot boundary. As a result, users that view such a moving thumbnail 241 may see an abrupt change and have a poor user experience. To address that, shot boundary module 250 may modify moving thumbnail 241, in response to detecting a shot boundary, to reduce the length of moving thumbnail 241 so that the first video frame of moving thumbnail 241 does not start before the shot boundary and/or the last video frame of 241 does not end after the shot boundary. Moving thumbnail 251 may be stored in data store 106. More details about shot boundary module 250 are discussed below with respect to FIG. 4.

Playback speed module 260 may receive moving thumbnail 251 from shot boundary module 250 or data store 106. Playback speed module 260 may measure the playback speed of moving thumbnail 251 and adjust the playback speed of moving thumbnail 251. Similar to motion scorer discussed above, playback speed module 260 may measure the motion between two adjacent video frames of moving thumbnail 251. All or some of the adjacent video frames of moving thumbnail 251 may be measured. The motion score of all or some of the adjacent video frames may be aggregated to generate a motion score total. In one implementation, one or more thresholds may be implemented. The motion score total may be compared to the thresholds, and responsive to the comparison, the playback speed of the moving thumbnail 251 may be modified. The modified playback speed of moving thumbnail 251 may be stored as an identifier in, for example, the metadata of moving thumbnail 261. Playback speed module 260 may generate a modified moving thumbnail 261 and store moving thumbnail 261 in data store 106.

For example, playback speed module 260 receives moving thumbnail 251 from shot boundary module 250. Playback speed module 260 measures the motion between some or all the adjacent video frames of moving thumbnail 251 to generate multiple motion scores. The motion scores are aggregated (e.g., summed, averaged, etc.) to generate a motion score total. For example, the motion score total is 0.2 on a scale of 0 to 1 (e.g., low motion to high motion, respectively). The motion score total may be comparted to three thresholds, 0.3 (first threshold), 0.6 (second threshold), and 0.8 (third threshold), that may be defined by an administrator. If the total motion score is below the first threshold, the playback speed is increased to "n" (e.g., 2) times the current playback speed. If the total motion score is between the first threshold and the second threshold, the playback speed is increased to m (e.g., 1.8) times the current playback speed. If the total motion score is between the second threshold and the third threshold, the playback speed is increased to x (e.g., 1.3) times the current playback speed. If the total motion score exceeds the third threshold, the playback speed remains the same as the current playback speed. It should be noted that any number of thresholds and/or playback speeds may be implemented.

Figure 3:
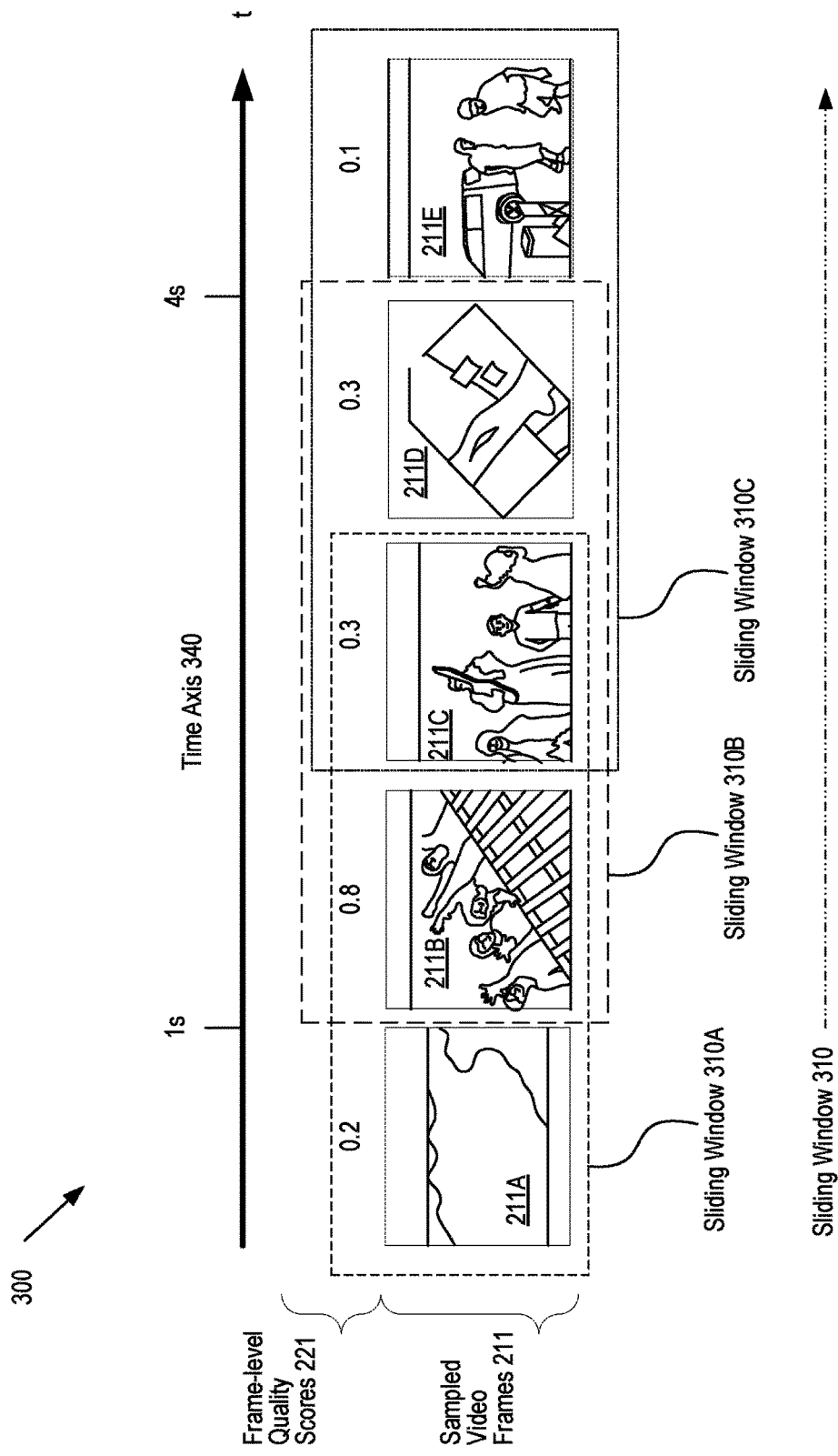
FIG. 3 is an example block diagram illustrating how a group-level quality scorer implements a sliding window, in accordance with another implementation of the disclosure.

FIG. 3 is an example block diagram 300 illustrating how a group-level quality scorer implements a sliding window, in accordance with another implementation of the disclosure. Group-level quality scorer may be similar to group-level quality scorer 230 as described with respect to FIG. 2.

As shown, sampled video frames 211 can be aligned respective to time axis 340. Sampled video frames 211 include sampled video frame 211A-211E. It should be noted that sampled video frames 211 may include the same, more, or fewer video frames. Sampled video frames 211 may be aligned based on a timestamp associated with each sampled video frame 211. Each sampled video frames 211 is shown with an associated one of the frame-level quality scores 221. For example, sampled video frame 211A has a frame-level quality score of 0.2 and sampled video frame 211B has a frame-level quality score of 0.8. It may be noted that the numbers, sizes, equations below are used for purposes of illustration, rather than limitation.

As shown, a sliding window 310 of a size of 3 seconds can be used. The size of sliding window 310 may be determined from the desired duration/length of a moving thumbnail. For example, if a moving thumbnail is to be 3 seconds long, a sliding window of 3 seconds may be selected. It should be noted that the size of a sliding window 310 may be any size, may be a variable size, and selected by different or additional criteria. The sampling rate of the associated video item may be 1 fps, for example.

In an example, sliding window 310A may be applied to sampled video frames three times (move to three different positions) until all the sampled video frames 211 are included in at least one group. Sliding window 310A starts at a first position with respect to time axis 340. The first group of sampled video frames when the sliding window 310A is at the first position includes sampled video frames 211A, 211B, and 211C. The group-level quality score for the first group may be the aggregate of group-level quality scores for the sampled video frames 211A-211C of the first group. For example, the group-level quality score for the first group may be 0.2+0.8+0.3=1.3.

Sliding window 310 may move to a second position, for example to the next one of sampled video frames 211. Sliding window 310B illustrates the sliding window 310 in a second position with respect to time axis 340. The second group of sampled video frames when the sliding window 310B is at the second position includes sampled video frames 211B, 211C, and 211D. The group-level quality score for the second group may be the aggregate of group-level quality scores for the sampled video frames 211B-211D of the second group. For example, the group-level quality score for the second group may be 0.8+0.3+0.3=1.4.

Sliding window 310 may move to a third position with respect to time axis 340. Sliding window 310C illustrates the sliding window 310 in a third position with respect to time axis 340. The third group of sampled video frames when the sliding window 310C is at the third position includes sampled video frames 211C, 211D, and 211E. The group-level quality score for the third group may be the aggregate of group-level quality scores for the sampled video frames 211C-211E of the third group. For example, the group-level quality score for the third group may be 0.3+0.3+0.1=0.7.

In one implementation, group-level quality scorer 300 selects one of the groups based on the multiple group-level quality scores. For example, group-level quality scorer 300 may select the highest group-level quality score and select the second group that includes sampled video frames 211B-211D. The second group includes a set of consecutively sampled video frames, e.g., sampled video frames 211B-211D. The first sampled video frame (e.g., sampled video frame 211B) and the last sampled video frame (e.g., sampled video frame 211D) have a start timestamp and end timestamp, respectively. The start and end timestamps may be used to retrieve additional video frames between the start and end timestamps. The retrieved video frames may be used to generate the moving thumbnail for the particular video item.

Figure 4:
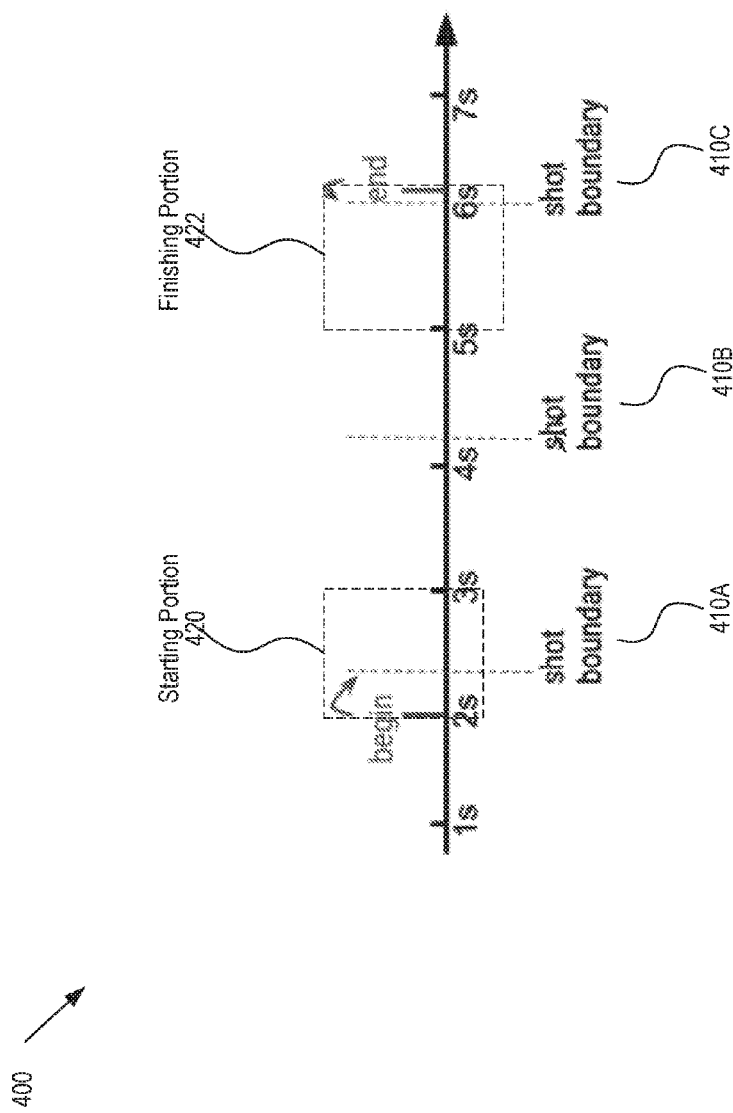
FIG. 4 is an example block diagram illustrating an operation of a shot boundary module, in accordance to some implementations of the disclosure.

FIG. 4 is an example block diagram 400 illustrating an operation of a shot boundary module, in accordance with some implementations of the disclosure. Shot boundary module may be similar to shot boundary module 250 as described with respect to FIG. 2. Shot boundary module may determine if a starting portion 420 of a moving thumbnail and/or a finishing portion 422 of a moving thumbnail is near a shot boundary 410. In one implementation, a shot boundary 410 may be determined using motion detection between two adjacent video frames. Motion detection of shot boundary module 400 may be similar to the motion detection discussed above with respect to the motion scorer. Motion detection may use a motion scorer to generate a motion quality score between two adjacent video frames of a moving thumbnail. Motion detection may be helpful in determining a shot boundary 410. For instance, when two shots are edited together, the last video frame of the preceding shot and first video frame of the subsequent shot are likely to be different scenes. Since the shots are of different scenes, the last video frame of the preceding shot and the first video frame of the subsequent shot are likely to show a large amount of motion and generate a large motion quality score.

In one example, the beginning and/or ending of a moving thumbnail may respectively precede and/or follow a shot boundary. As a result, users that view such a moving thumbnail may see an abrupt change close to the beginning and/or the ending of the moving thumbnail. Such an abrupt change close to the beginning and/or the ending of the moving thumbnail is not expected by the users, and therefore it may negatively affect their viewing experience. Aspects of the present disclosure address this by reducing the size of a moving thumbnail. In particular, the shot boundary for a starting portion and/or finishing portion of a moving thumbnail may be determined. A starting portion of a moving thumbnail may be a time portion of the moving thumbnail that includes the first video frame of the moving thumbnail and the subsequent video frames a time/distance "x" from the first video frame (e.g., a 1 second time portion of the moving thumbnail that includes the first video frame and all the subsequent video frames in the first second of the moving thumbnail). A finishing portion 422 of a moving thumbnail may be a time portion of a moving thumbnail that includes the last video frame of the moving thumbnail and the previous video frames a time/distance "y" before the last video frame (e.g., a 1 second time portion of the moving thumbnail that includes the last video frame and all the previous video frames in the last second of the moving thumbnail).

For example, FIG. 4 illustrates a moving thumbnail that is 4 seconds long and incorporates the video frames of a video item starting at 2 seconds and ending at 6 seconds (e.g., "begin" and "end"). A shot boundary 410A may be detected in a starting portion 420 (e.g., approximately at 2.3 seconds) of the moving thumbnail. For example, a motion quality score of two adjacent video frames around 2.3 seconds may exceed a threshold. A shot boundary 410C may be detected in a finishing portion 422 (e.g., approximately at 5.9 seconds) of the moving thumbnail. For example, a motion quality score of two adjacent video frames around 5.9 seconds may exceed a threshold. In response to shot boundary module 400 detecting the shot boundary 410A in the starting portion 420 of moving thumbnail, the length of the moving thumbnail may be decreased so that the first video frame of the moving thumbnail does not start before shot boundary 410A (e.g., remove video frames from moving thumbnail from 2 seconds to 2.3 seconds). In response to shot boundary module 400 detecting the shot boundary 410C in the finishing portion 422 of the moving thumbnail, the length of the moving thumbnail may be decreased so that the last video frame of the moving thumbnail does not end after shot boundary 410C (e.g., by removing video frames from 5.9 seconds to up to 6 seconds).

The middle portion of the moving thumbnail may also contain a shot boundary (e.g., shot boundary 410B). A moving thumbnail with a shot boundary in the middle portion of the moving thumbnail is more likely to be expected by the users and therefore may not negatively impact their viewing experience. In addition, reducing the length of the moving thumbnail so that the first video frame of the moving thumbnail does not start before the shot boundary 410B in the middle portion and/or the last video frame of the moving thumbnail does not end after the shot boundary 410B in the middle portion, may make the moving thumbnail too short in duration to effectively communicate information about the associated video item. As a result, in some implementations, the shot boundaries in the middle portion of the moving thumbnail are ignored and only the shot boundaries in the starting and finishing portions of the moving thumbnail are considered when modifying the size of the moving thumbnail.

Figure 5:
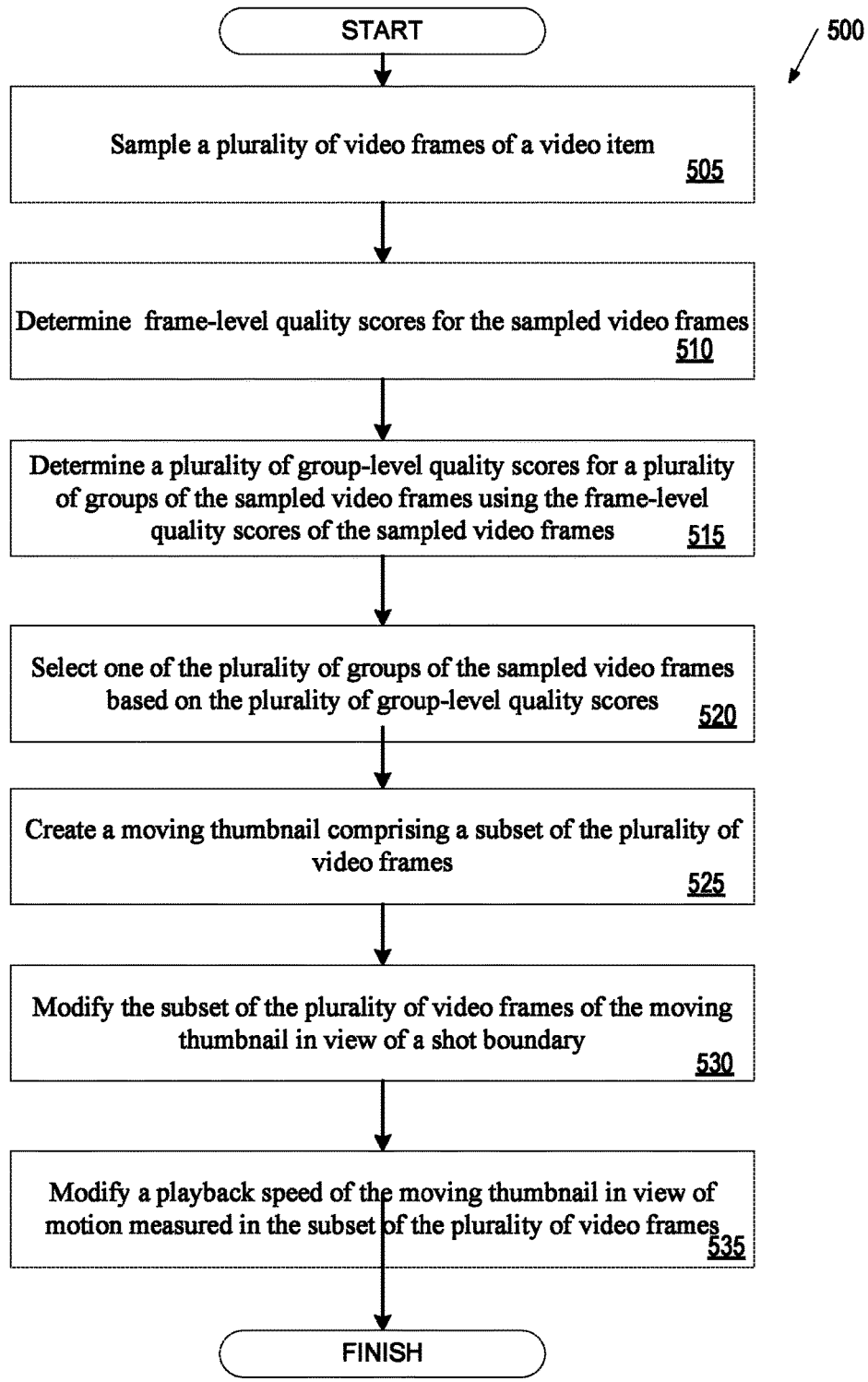
FIG. 5 is a flow diagram illustrating moving thumbnail generation, in accordance with some implementations.

FIG. 5 is a flow diagram illustrating moving thumbnail generation, in accordance with some implementations. Method 500 may be performed by processing logic that includes hardware (e.g., circuitry, dedicated logic, programmable logic, microcode), software (e.g., instructions run on a processing device to perform hardware simulation), or a combination thereof. In one implementation, moving thumbnail generator 140 of server 130 may perform some or all the operations described herein.

Method 500 begins at block 505 where processing logic samples multiple video frames of a video item. At block 510, processing logic determines frame-level quality scores for the sampled video frames. At block 515, processing logic determines multiple group-level quality scores for multiple groups of the sampled video frames using the frame-level quality scores of the sampled video frames. At block 520, processing logic selects one of the multiple groups of the sampled video frames based on the plurality of group-level quality scores. At block 525, processing logic creates a moving thumbnail including a subset of the plurality of video frames in view of the selected group. At block 530, processing logic modifies the subset of the multiple video frames of the moving thumbnail in view of a shot boundary. At block 535, processing logic modifies a playback speed of the moving thumbnail in view of motion measured in the subset of the plurality of video frames.

For simplicity of explanation, the processes of this disclosure are depicted and described as a series of acts. However, acts in accordance with this disclosure can occur in various orders and/or concurrently, and with other acts not presented and described herein. Furthermore, not all illustrated acts may be required to implement the processes in accordance with the disclosed subject matter. In addition, those skilled in the art will understand and appreciate that the processes could alternatively be represented as a series of interrelated states via a state diagram or events. Additionally, it should be noted that the processes disclosed in this specification are capable of being stored on an article of manufacture to facilitate transporting and transferring such processes to computing devices. The term "article of manufacture," as used herein, is intended to encompass a computer program accessible from a non-transitory computer-readable device or storage media.

Figure 6:
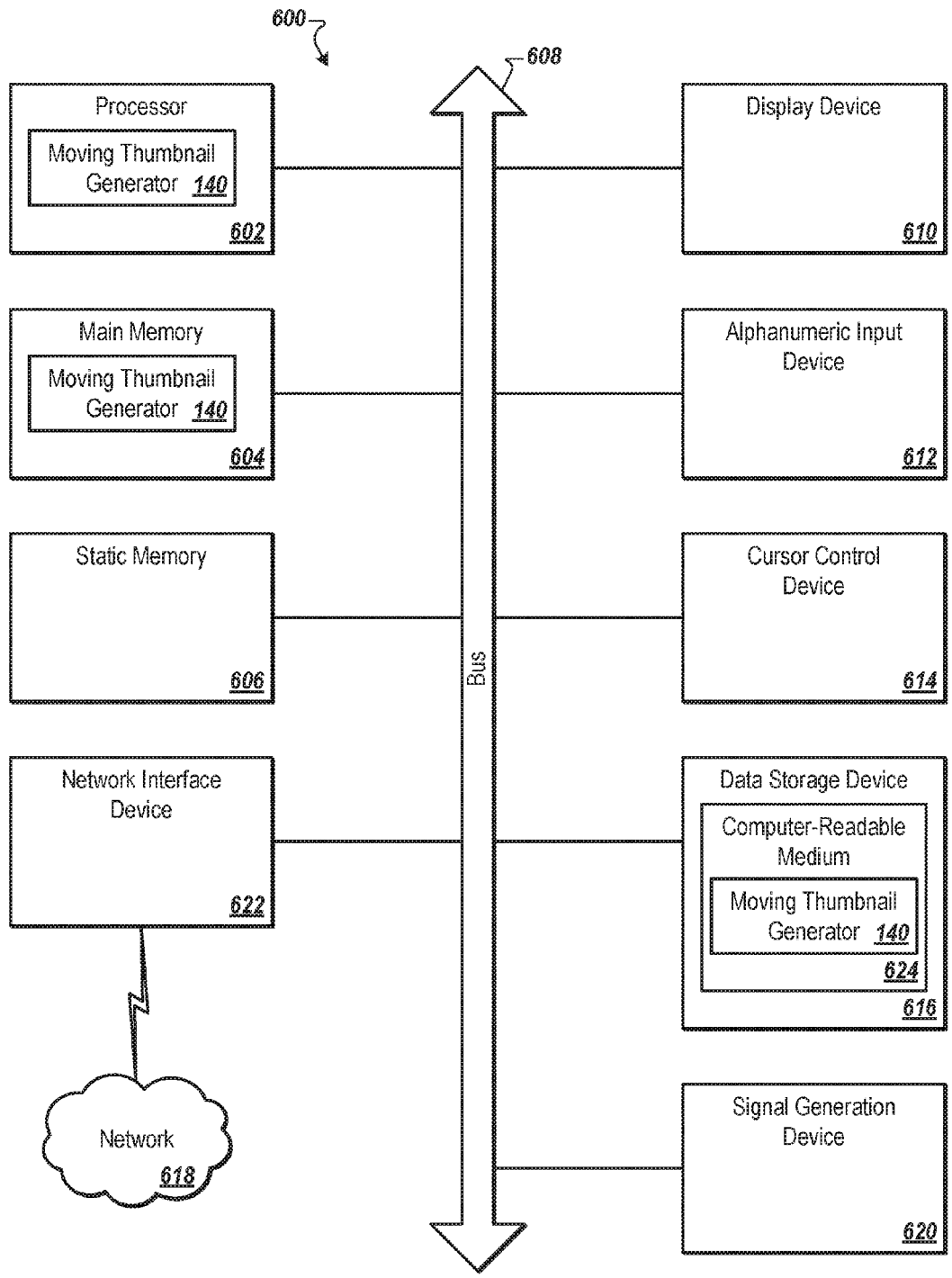
FIG. 6 is a block diagram illustrating an exemplary computer system, according to some implementations.

FIG. 6 is a block diagram illustrating an exemplary computer system 600. The computer system 600 executes one or more sets of instructions that cause the machine to perform any one or more of the methodologies discussed herein. Set of instructions, instructions, and the like may refer to instructions that, when executed computer system 600, cause computer system 600 to perform one or more operations of moving thumbnail generator 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and the moving thumbnail generator 140 for performing the operations and steps discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 and moving thumbnail generator 140 embodying any one or more of the methodologies or functions described herein. The sets of instructions of the system architecture 100 and moving thumbnail generator 140 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "sampling", "selecting", "determining", "creating", "generating", "summing", "modifying", "applying", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

We claim:

1. A method comprising:
sampling a plurality of video frames of a video item;
determining frame-level quality scores for the sampled video frames of the video item, wherein a frame-level quality score of a respective one of the sampled video frames is indicative of a quality of the respective video frame of the video item;
applying a sliding window to the sampled video frames to identify a plurality of groups of the sampled video frames for scoring on a group-level, wherein the sliding window groups multiple sets of consecutively sampled video frames into the plurality of groups of the sampled video frames, wherein at least two of the multiple sets of consecutively sampled video frames overlap, comprise a same sampled video frame and are scored on the group-level to provide an indication of a quality of a respective set of consecutively sampled video frames for inclusion in a moving thumbnail;
determining, by a processing device, a plurality of group-level quality scores for the plurality of groups of the sampled video frames of the video item, the plurality of groups identified by applying the sliding window, wherein the group-level quality scores are determined using the frame-level quality scores of the sampled video frames;
selecting one of the plurality of groups of the sampled video frames of the video item based on the plurality of group-level quality scores, wherein the group of sampled video frames selected based on a respective group level quality score includes a set of consecutively sampled video frames of the multiple sets of consecutively sampled video frames and has a start timestamp associated with a first sampled video frame in the set of consecutively sampled video frames and an end timestamp associated with a last sampled video frame in the set of consecutively sampled video frames; and
creating the moving thumbnail using the group of sampled video frames selected based on the respective group level quality score, the moving thumbnail comprising a subset of the plurality of video frames that have timestamps within a range from the start timestamp to the end timestamp.

2. The method of claim 1, wherein the plurality of video frames of the video item are sampled at a fixed sampling rate.

3. The method of claim 1, wherein the plurality of video frames of the video item are sampled from a beginning portion of the video item.

4. The method of claim 1, wherein determining the frame-level quality scores for the sampled video frames comprises:
generating one or more quality scores for each of the sampled video frames in view of one or more of a plurality of frame-level scorers; and
summing the one or more quality scores for each of the sampled video frames to generate the frame-level quality scores for the sampled video frames.

5. The method of claim 4, generating one or more quality scores for each of the sampled video frames in view of one or more of a plurality of frame-level scorers comprises:
generating a first quality score for each of the sampled video frames using a thumbnail quality scorer that measures a visual quality of the sampled video frames;
generating a second quality score for each of the sampled video frames using a face scorer that measures a size of a face relative to a size of the sampled video frames; and
generating a third quality score for each of the sampled video frames using a motion scorer that measures motion between two consecutively sampled video frames.

6. The method of claim 4, wherein summing the quality scores for each the sampled video frames comprises summing the quality scores using a linear weighted summation.

7. The method of claim 1, wherein applying the sliding window to the sampled video frames to identify the plurality of groups of the sampled video frames for scoring on the group-level further comprises:
applying the sliding window to different positions along a time axis to group the sampled video frames into the plurality of groups of the sampled video frames, wherein the sampled video frames are ordered with respect to the time axis, and wherein frame-level quality scores of a particular group of sampled video frames are used to determine a group-level quality score for the particular group.

8. The method of claim 1, wherein applying the sliding window to the sampled video frames to identify the plurality of groups of the sampled video frames for scoring on the group-level further comprises:
applying the sliding window to a first position with respect to a time axis, wherein the sliding window extends for a fixed duration and a first group of the plurality of groups of the sampled video frames is within the sliding window at the first position with respect to the time axis; and
applying the sliding window to a second position with respect to the time axis, wherein a second group of the plurality of groups of the sampled video frames is within the sliding window at the second position with respect to the time axis; and
wherein determining the plurality of group-level quality scores for the plurality of groups of the sampled video frames using the frame-level quality scores of the sampled video frames further comprises:
determining a first group-level quality score of the plurality of group-level quality scores by aggregating frame-level quality scores associated with the first group of sampled video frames; and
determining a second group-level quality score of the plurality of group-level quality scores by aggregating frame-level quality scores associated with the second group of sampled video frames.

9. The method of claim 1, wherein the selected group has a highest group-level quality score.

10. The method of claim 1, further comprising modifying the subset of the plurality of video frames of the moving thumbnail to cause at least one of a first video frame of the subset of the plurality of video frames or a last video frame of the subset of the plurality of video frames to be proximate a shot boundary of the video item.

11. The method of claim 1, further comprising modifying a playback speed of the moving thumbnail in view of motion measured in the subset of the plurality of video frames of the moving thumbnail.

12. The method of claim 1, wherein the moving thumbnail is in a Graphic Interchange Format (GIF).

13. The method of claim 1, wherein the moving thumbnail is in an H.264 format.

14. A non-transitory computer-readable medium storing instructions that, responsive to execution by a processing device, cause the processing device to perform operations comprising:
sampling a plurality of video frames of a video item;
determining frame-level quality scores for the sampled video frames of the video item, wherein a frame-level quality score of a respective one of the sampled video frames is indicative of a quality of the respective video frame of the video item;
applying a sliding window to the sampled video frames to identify a plurality of groups of the sampled video frames for scoring on a group-level, wherein the sliding window groups multiple sets of consecutively sampled video frames into the plurality of groups of the sampled video frames, wherein at least two of the multiple sets of consecutively sampled video frames overlap, comprise a same sampled video frame and are scored on the group-level to provide an indication of a quality of a respective set of consecutively sampled video frames for inclusion in a moving thumbnail;
determining, by the processing device, a plurality of group-level quality scores for the plurality of groups of the sampled video frames of the video item, the plurality of groups identified by the sliding window, wherein the group-level quality scores are determined using the frame-level quality scores of the sampled video frames;
selecting one of the plurality of groups of the sampled video frames of the video item based on the plurality of group-level quality scores, wherein the group of sampled video frames selected based on a respective group level quality score includes a set of consecutively sampled video frames of the multiple sets of consecutively sampled video frames and has a start timestamp associated with a first sampled video frame in the set of consecutively sampled video frames and an end timestamp associated with a last sampled video frame in the set of consecutively sampled video frames; and
creating the moving thumbnail using the group of sampled video frames selected based on the respective group level quality score, the moving thumbnail comprising a subset of the plurality of video frames that have timestamps within a range from the start timestamp to the end timestamp.

15. The non-transitory computer-readable medium of claim 14, the operations further comprising:

generating one or more quality scores for each of the sampled video frames in view of one or more of a plurality of frame-level scorers; and summing the one or more quality scores for each of the sampled video frames to generate the frame-level quality scores for the sampled video frames.

16. The non-transitory computer-readable medium of claim 14, wherein applying the sliding window to the sampled video frames to identify the plurality of groups of the sampled video frames for scoring on the group-level further comprising:

applying the sliding window to different positions along a time axis to group the sampled video frames into the plurality of groups of the sampled video frames, wherein the sampled video frames are ordered with respect to the time axis, and wherein frame-level quality scores of a particular group of sampled video frames are used to determine a group-level quality score for the particular group.

17. The non-transitory computer-readable medium of claim 14, the operations further comprising:

modifying the subset of the plurality of video frames of the moving thumbnail to cause least one of a first video frame of the subset of the plurality of video frames or a last video frame of the subset of the plurality of video frames to be proximate a shot boundary of the video item; and modifying a playback speed of the moving thumbnail in view of motion measured in the subset of the plurality of video frames of the moving thumbnail.

18. A system comprising:

a memory; and a processing device, coupled to the memory, the processing device to:

sample a plurality of video frames of a video item;

determine frame-level quality scores for the sampled video frames of the video item, wherein a frame-level quality score of a respective one of the sampled video frames is indicative of a quality of the respective video frame of the video item;

apply a sliding window to the sampled video frames to identify a plurality of groups of the sampled video frames for scoring on a group-level, wherein the sliding window groups multiple sets of consecutively sampled video frames into the plurality of groups of the sampled video frames, wherein at least two of the multiple sets of consecutively sampled video frames overlap, comprise a same sampled video frame and are scored on the group-level to provide an indication of a quality of a respective set of consecutively sampled video frames for inclusion in a moving thumbnail;

determine a plurality of group-level quality scores for the plurality of groups of the sampled video frames of the video item, the plurality of groups identified by applying the sliding window, wherein the group-level quality scores are determined using the frame-level quality scores of the sampled video frames;

select one of the plurality of groups of the sampled video frames of the video item based on the plurality of group-level quality scores, wherein the group of sampled video frames selected based on a respective group level quality score includes a set of consecutively sampled video frames of the multiple sets of consecutively sampled video frames and has a start timestamp associated with a first sampled video frame in the set of consecutively sampled video frames and an end timestamp associated with a last sampled video frame in the set of consecutively sampled video frames; and create the moving thumbnail using the group of sampled video frames selected based on the respective group level quality score, the moving thumbnail comprising a subset of the plurality of video frames that have timestamps within a range from the start timestamp to the end timestamp.

19. The system of claim 18, wherein to determine frame-level quality scores for the sampled video frames, the processing device further to:

generate one or more quality scores for each of the sampled video frames in view of one or more of a plurality of frame-level scorers; and sum the one or more quality scores for each of the sampled video frames to generate the frame-level quality scores for the sampled video frames.

20. The system of claim 18, the processing device further to:

modify the subset of the plurality of video frames of the moving thumbnail to cause at least one of a first video frame of the subset of the plurality of video frames or a last video frame of the subset of the plurality of video frames to be proximate a shot boundary of the video item; and modify a playback speed of the moving thumbnail in view of motion measured in the subset of the plurality of video frames of the moving thumbnail.

* * * * *